United States Patent
Yagasaki

[11] Patent Number: 6,123,637
[45] Date of Patent: Sep. 26, 2000

[54] METAL V-BELT

[75] Inventor: Toru Yagasaki, Utsunomiya, Japan

[73] Assignee: Honda Giken Kogyo Kabushiki Kaisha, Tokyo, Japan

[21] Appl. No.: 09/325,744

[22] Filed: Jun. 4, 1999

[30] Foreign Application Priority Data

Jun. 8, 1998 [JP] Japan .................................. 10-158772

[51] Int. Cl.[7] ...................................................... F16G 5/16
[52] U.S. Cl. ............................................................ 474/242
[58] Field of Search .................... 474/240, 242, 474/244, 246

[56] References Cited

U.S. PATENT DOCUMENTS

| | | | |
|---|---|---|---|
| 3,720,113 | 3/1973 | Van Doorne et al. | 474/242 |
| 4,579,549 | 4/1986 | Okawa et al. | 474/242 |
| 4,619,634 | 10/1986 | Nakawaki | 474/242 X |
| 4,832,671 | 5/1989 | Satoh | 474/242 |
| 5,931,756 | 8/1999 | Ohsono et al. | 474/167 |

FOREIGN PATENT DOCUMENTS

| | | |
|---|---|---|
| 0 283 303 | 9/1988 | European Pat. Off. . |
| 0 377 918 | 7/1990 | European Pat. Off. . |
| 0 626 526 | 11/1994 | European Pat. Off. . |
| 62-037535 | 2/1987 | Japan . |
| 62-131143 | 8/1987 | Japan . |
| 2-225840 | 9/1990 | Japan . |
| 7-12177 | 1/1995 | Japan . |

Primary Examiner—Rodney H. Bonck
Attorney, Agent, or Firm—Armstrong, Westerman, Hattori, McLeland & Naughton

[57] ABSTRACT

A metal V-belt MV comprises endless belt-form metal rings 20 and numerous metal elements 10 supported along these metal rings 20. The metal rings 20 comprise a plurality of thin, endless belt-form metal ring sheets superposed in the radial direction, and of these ring sheets, the outermost and innermost ring sheets 20a and 20b are made from a metal material with high wear resistance, while the rest of the ring sheets 20c in the middle are made from a metal material with high tensile strength.

8 Claims, 4 Drawing Sheets

METAL V-BELT

FIELD OF THE INVENTION

The present invention relates to a metal V-belt used for the transmission of power in a V-belt continuously variable transmission or the like, and more particularly to a metal V-belt characterized in the configuration of the endless belt-form metal ring member that constitutes this metal V-belt.

BACKGROUND OF THE INVENTION

Metal V-belts such as this have been known for some time, and are disclosed, for example, in Japanese Utility Model Laid-Open No. 62-131143, Japanese Patent Laid-Open No. 2-225840, and Japanese Patent Laid-Open No. 7-12177. These metal V-belts used in the past comprise an endless belt-form ring member and numerous metal element members (also called metal links) supported along this ring, and are looped between a drive pulley and a driven pulley so as to transmit power. These two pulleys are designed so that the width of the V-groove thereof can be varied, and are designed so that the loop radius of the V-belt can be varied and the gear ratio continuously varied by varying this V-groove width.

When power is transmitted between the two pulleys by a metal V-belt such as this, the metal element members are pushed upon while the power is transmitted, so that the power is transmitted by the compression force acting on the metal element members. At this time a tensile force acts on the metal ring member that ties the numerous metal element members together in a ring, flexural stress acts [on this metal ring member] while [the V-belt] is looped around the two pulleys, and frictional force acts on the portion in contact with the metal element members.

It is therefore necessary to take into account these various forces that act on the ring member, and to optimize the material, shape, and so on thereof so that the strength and service life will be satisfactory with respect to these forces. Here, the ring member generally comprises a plurality of superposed, thin, endless belt-form metal ring sheets, and since the innermost and outermost ring sheets are in contact with the metal element members, they are subjected to frictional force and are prone to wear, making the durability of the innermost and outermost ring sheets the most frequently encountered problem.

SUMMARY OF THE INVENTION

The present invention was conceived in light of this problem, and an object thereof is to provide a metal V-belt configured such that a metal ring member comprising superposed, thin, endless belt-form metal ring sheets has sufficient strength and durability.

In order to achieve this object, in the present invention a metal V-belt for transmitting power, looped between a drive pulley and a driven pulley, comprises an endless belt-form metal ring member and numerous metal element members supported along this metal ring member, wherein this metal ring member comprises a plurality of thin, endless belt-form metal ring sheets superposed in the radial direction, and of these ring sheets, the innermost and outermost ring sheets are made of a metal material with high wear resistance, and the rest of the ring sheets (middle ring sheets) are made of a metal material with a high Young's modulus.

In a state in which the metal V-belt is looped between the drive and driven pulleys and is transmitting drive force, the metal ring member is subjected to tensile force, and is also subjected to a flexing force produced by flexural deformation corresponding to the loop radius when it is looped around the two pulleys. Furthermore, the innermost and outermost ring sheets are in contact with the metal element members and are subjected to frictional force. Here, with the metal V-belt of the present invention, because the innermost and outermost ring sheets are made from a metal material with high wear resistance, they are less susceptible to wear by contract with the metal element members. Moreover, the rest of the ring sheets are made of a metal material with a high Young's modulus, but the lower is the Young's modulus, the greater is the elongation when subjected to tensile force, so more of the tensile force acting on the metal ring member is received by the member with the higher Young's modulus. Consequently, the innermost and outermost ring sheets, which are made of a metal material with high wear resistance, have less tensile stress, while the middle ring sheets have more tensile stress. As a result, the innermost and outermost ring sheets primarily serve to provide wear resistance, and the middle ring sheets provide tensile strength, resulting in an overall increase in strength durability.

Of course, it is better for the metal material that makes up the middle ring sheets, where the tensile stress is higher, to have high tensile strength and tensile fatigue strength.

It is preferable to use maraging steel for the metal material with high wear resistance, and to use stainless steel as the metal material with high tensile strength.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 2:
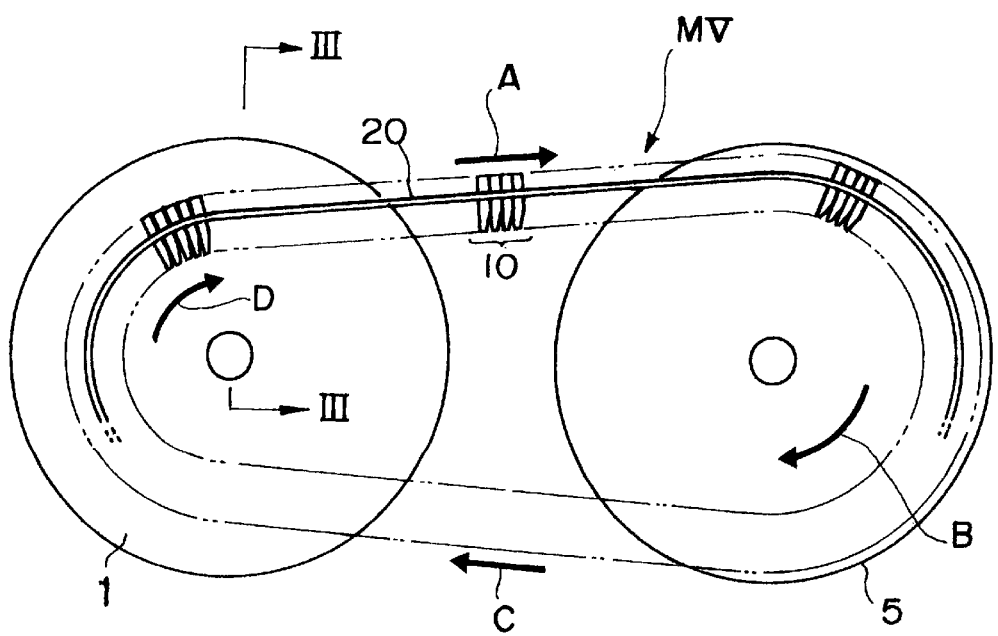
FIG. 2 is a schematic illustrating the state in which this metal V-belt has been looped around and driven pulleys.

As shown in FIG. 2, the metal V-belt MV pertaining to the present invention comprises endless belt-form metal rings 20 and numerous metal elements (metal links) 10 supported along these metal rings 20, with power being transmitted when [this metal V-belt] is looped around a drive pulley 1 and a driven pulley 5, each of which has a V-groove of variable width.

Figure 3:
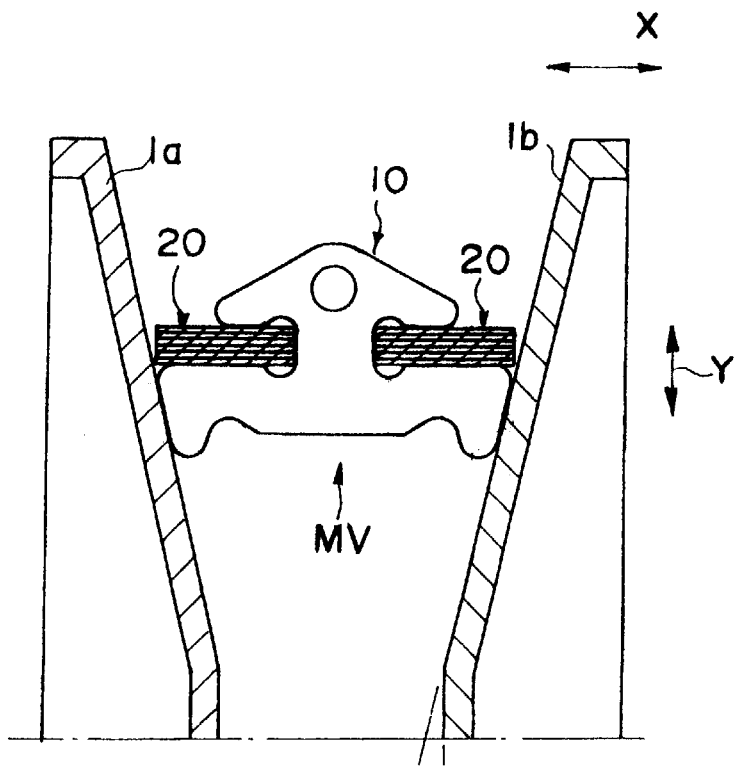
FIG. 3 is a cross section of the metal V-belt when looped around the drive pulley.

FIG. 3 shows a state in which the metal V-belt MV is looped around the drive pulley 1. In this state, the metal elements 10 are fitted into the V-groove of the drive pulley 1, which comprises a stationary pulley half 1a and a movable pulley half 1b. Controlling [the system] such that the movable pulley half 1b is moved in the axial direction (X direction) allows the metal elements 10 to be moved in the radial direction (Y direction), and allows the loop radius of the metal V-belt MV to be varied with respect to the drive pulley 1. Similarly, the loop radius of the metal V-belt can be varied for the driven pulley 5 as well, and controlling the loop radii of both [pulleys] makes it possible to continuously adjust the gear ratio between the pulleys 1 and 5.

Figure 1:
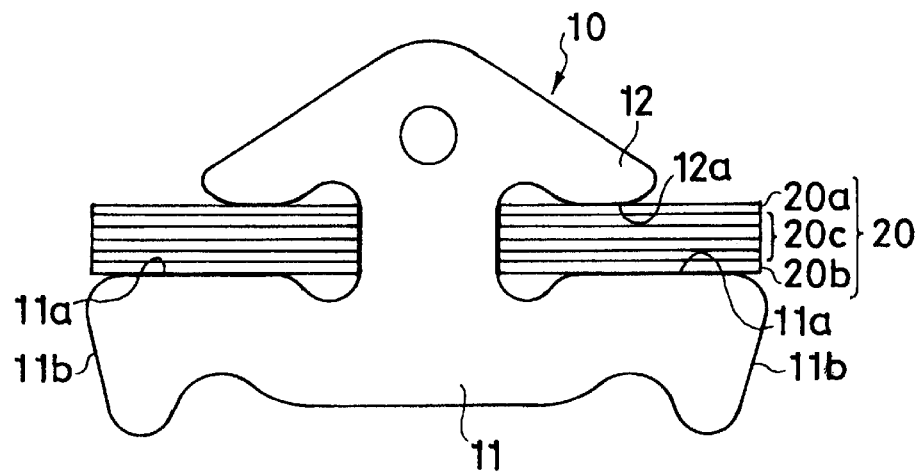
FIG. 1 is a front cross section of the metal V-belt pertaining to the present invention.
Figure 4:
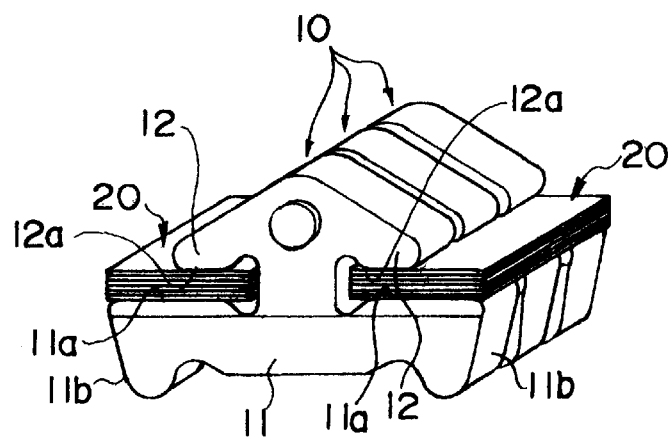
FIG. 4 is an oblique view of the metal V-belt pertaining to the present invention.

This metal V-belt MV is shown in detail in FIGS. 1 and 4. The metal elements 10 are made in a shape having a body 11 with V-surfaces 11b on the left and right ends, and ears 12 that extend upward and out to the left and right from the center of this body 11. A smooth saddle surface 11a is formed on the left and right upper surfaces of the body 11, a smooth support surface 12a is formed on each of the lower surfaces of the left and right ears, and a pair of slots is formed in between the saddle surfaces and the support surfaces. A pair of the metal rings 20 is inserted into these slots on the left and right, so that numerous metal elements 10 are disposed along the metal rings 20. This constitutes the metal V-belt MV.

Here, the metal rings 20 each comprise a plurality (12, for example) thin endless belt-form metal ring sheets 20a, 20b, and 20c superposed in the radial direction. Of these ring sheets, the outermost ring sheet 20a and the innermost ring sheet 20b are made of 18Ni maraging steel (Young's modulus: 18,600 kgf/mm$^2$), and the plurality of middle ring sheets 20c positioned between these ring sheets 20a and 20b are also made by precipitation hardened stainless steel (Young's modulus: 20,400 kgf/mm$^2$). Maraging steel has superior wear resistance compared to stainless steel, whereas stainless steel has superior or equal tensile strength and fatigue strength compared to maraging steel. Since the Young's modulus of stainless steel is higher than that of maraging steel, the tensile force applied on the maraging steel is low.

Let us consider the force to which the metal rings 20 structured as above are subjected when looped around the drive and driven pulleys 1 and 5 and power is transmitted as shown in FIG. 2. When the two pulleys 1 and 5 rotate as indicated by arrows B and D and the drive force is transmitted from the drive pulley 1 to the driven pulley 5, the drive force is transmitted as a result of the metal elements 10 being pressed down in the straight region indicated by arrow A (called the outgoing arc region A). Accordingly, in this straight region A the metal rings 20 are subjected to a tensile force corresponding to the repulsion of this pressing force.

Next, in the region where [the V-belt] is looped around the driven pulley 5, indicated by arrow B (called the driven-side looped region B), the ring tension gradually decreases to the tensile force of the straight region C. In this looped region B, however, the metal rings 20, or more specifically the ring sheets 20a, 20b, and 20c, are subjected to flexural deformation at a radius of curvature corresponding to the loop radius with respect to the driven pulley 5, and this generates flexural stress. Furthermore, the metal rings 20 are subjected to a specific tensile force in the straight region C (called the return arc region C).

In the looped region indicated by arrow D (called the drive-side looped region D), the metal rings 20, or more specifically the ring sheets 20a, 20b, and 20c, are subjected to flexural deformation at a radius of curvature corresponding to the loop radius with respect to the drive pulley 1, and this generates flexural stress. At the same time, the tensile force gradually increases.

In all the regions, there is the possibility of the innermost and outermost rings 20a and 20b being worn by contact between the innermost ring 20b and the saddle surfaces 11a of the metal elements 10, and by contact between the support surfaces 12a and the outermost ring 20a.

Figure 5:
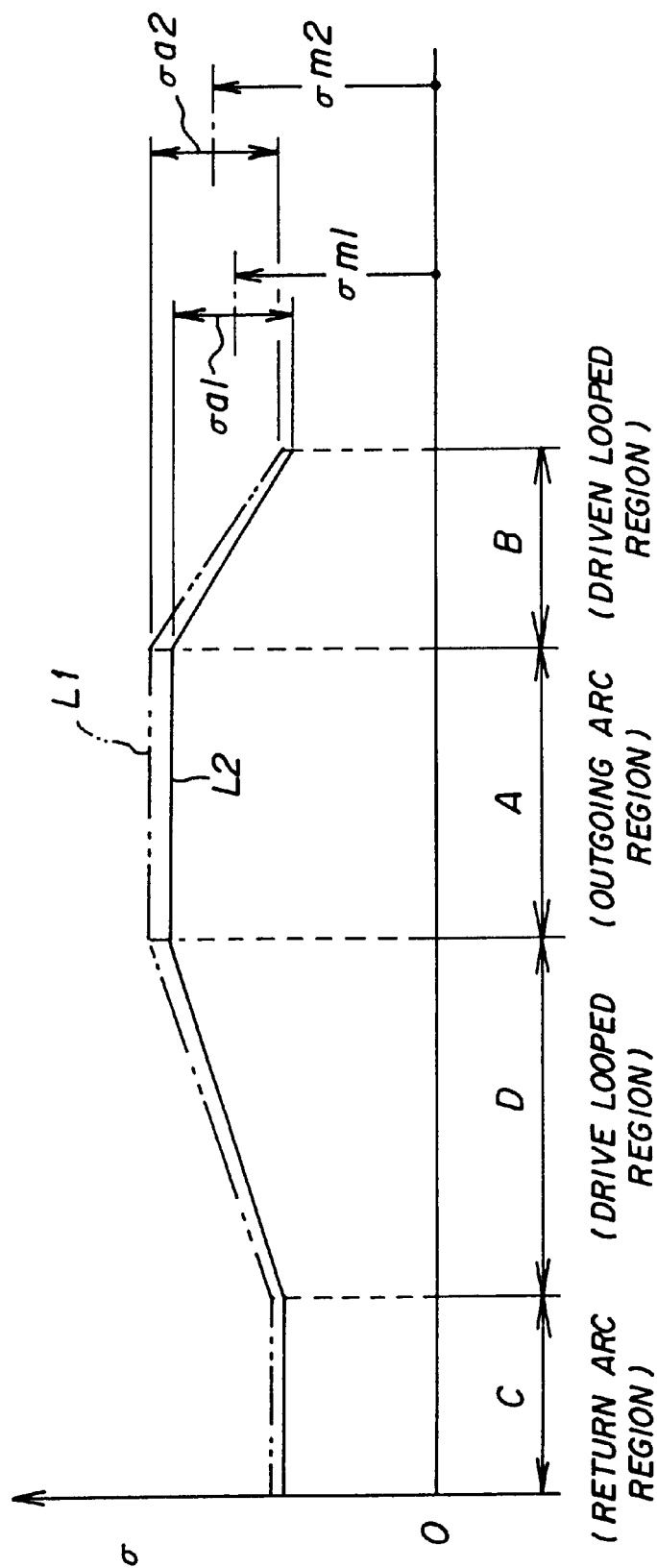
FIG. 5 is a graph of the changes in tensile stress acting on the metal ring.

FIG. 5 qualitatively illustrates the changes in the tensile stress σ that acts on the innermost metal ring 20b in the various regions A to D described above. The solid line L2 in FIG. 5 indicates the change in tensile stress of the metal ring 20b of the metal V-belt MV pertaining to the present invention, while the broken line L1 shows for the sake of reference the change in tensile stress of a conventional metal V-belt (a metal V-belt whose metal rings are all made from stainless steel). This figure also shows the difference σ a1 (present invention) and σ a2 (conventional) between the maximum tensile stress and minimum tensile stress, as well as the mean stress σ m1 (present invention) and σ m2 (conventional) thereof.

The above-mentioned tensile and flexural stress act on the metal rings 20, and these stresses repeatedly act [thereon] every time the metal V-belt MV makes a circuit around the pulleys 1 and 5. Accordingly, the design of the metal rings 20 needs to take into account the strength (particularly fatigue strength) and durability with respect to this tensile and flexural stress. Furthermore, the outermost ring sheet 20a and the innermost ring sheet 20b are subjected to the harshest requirements in terms of strength and durability because of the problem of wear due to contact with the support surfaces 12a and the saddle surfaces 11a, respectively.

In the case of the metal V-belt MV in this example, however, the outermost ring sheet 20a and the innermost ring sheet 20b are made from maraging steel, which has superior wear resistance, and this is effective at suppressing diminished durability due to wear. Furthermore, the middle ring sheets 20c are made of stainless steel, and these serve to provide tensile strength, and as there is no problem with wear [in the middle], there is an overall increase in durability (service life).

The Young's modulus of maraging steel (18,600 kgf/mm$^2$) is lower than the Young's modulus of stainless steel (20,400 kgf/mm$^2$), so the stainless steel bears a larger proportion of the tensile force that acts on the metal rings 20. Specifically, the tensile stress of the middle ring sheets 20c is greater than the tensile stress of the outermost and innermost ring sheets 20a and 20b, so the strength requirements with respect to tensile force are more relaxed for the outermost and innermost ring sheets 20a and 20b.

In other words, the outermost and innermost ring sheets 20a and 20b, with which wear is a problem and for which the strength requirements are the harshest, are made of a material with higher wear resistance, and less tensile stress acts thereon, and since the middle ring sheets 20c, of which wear resistance is not demanded, primarily serve to provide tensile fatigue strength, there is an overall increase in the durability of the metal rings 20.

A specific example will be described for the tensile stress in FIG. 5. A continuously variable transmission in which the metal V-belt of the present invention was used was driven, for example, at a gear ratio of 0.61 (top gear), an input speed of 6000 rpm, and an input torque of 143 Nm, at which time the mean stress σ m1 of the innermost ring sheet 20b was 16.63 kg/mm$^2$. In contrast, in the case of a conventional belt whose metal rings were all made of maraging steel, the mean stress σ m2 was 17.86 kg/mm$^2$ under the same drive conditions, which means that the mean stress was approximately 7% lower with the present invention.

Figure 6:
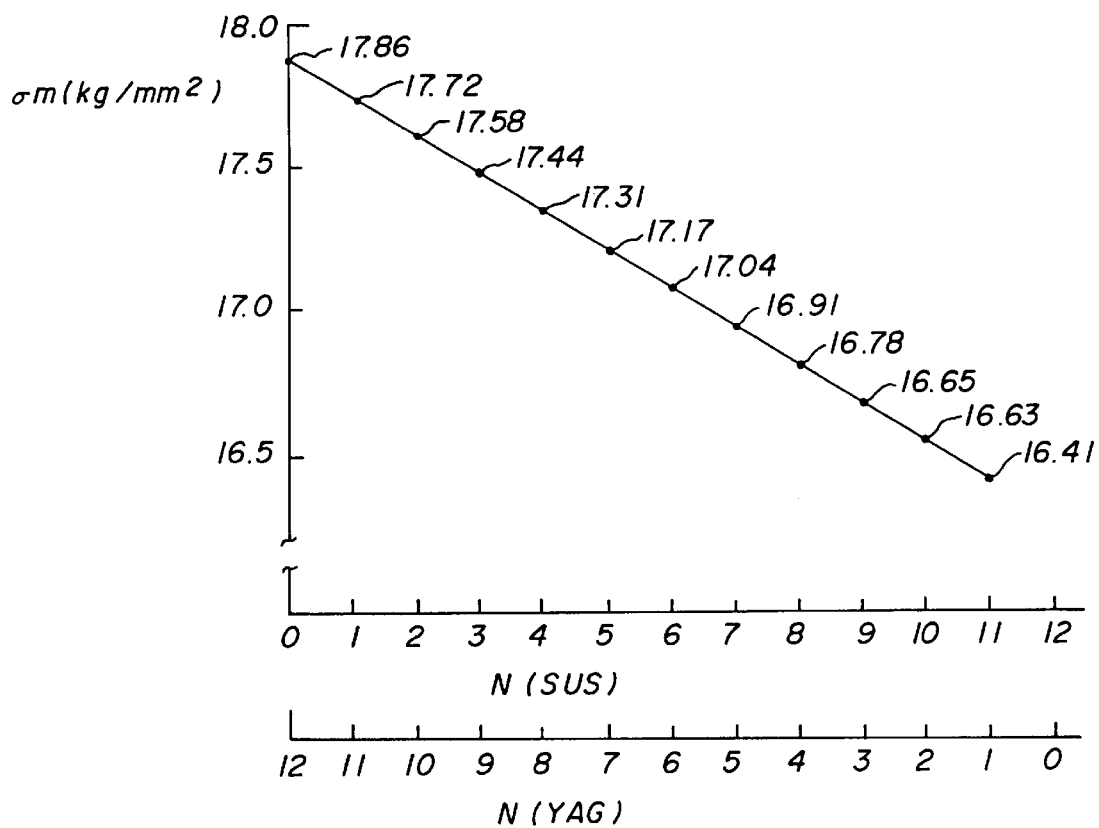
FIG. 6 is a graph of the stress changes in the innermost ring sheet made of maraging steel.

The metal V-belt pertaining to the present invention used in these calculations is such that the outermost and innermost ring sheets 20a and 20b are made of maraging steel, and the 10 ring sheets 20c in the middle are made of stainless steel. We are assuming here that the metal rings 20 consist of a total of 12 ring members. FIG. 6 shows the changes in stress of the innermost maraging steel ring 20b when the number N Y A G of metal rings made of maraging steel and the number N SUS of metal rings made of stainless steel were varied. As is clear from the figure, when NSUS=0 and N YAG=12, that is, when all of the metal rings are made of maraging steel, the mean tensile stress σ m is 17.86 kg/mm$^2$; as the number of metal rings made of stainless steel increases, the stainless steel metal rings receive more of the tensile force, so there is a decrease in the tensile stress of the innermost metal ring made of maraging steel. When wear resistance is taken into account, however, it is preferable for the innermost and outermost metal rings to be made of maraging steel.

Another advantage is that, since maraging steel is more expensive than stainless steel, using stainless steel for the middle ring sheets 20c lowers the cost compared to when all of the ring sheets are made of maraging steel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

The application claims the priority of Japanese Patent Application No.10-158772 filed on Jun. 8, 1998, which is incorporated herein by reference.

What is claimed is:

1. A metal V-belt for transmitting power, looped between a drive pulley and a driven pulley, comprising:

an endless belt-form metal ring member; and numerous metal element members supported along this metal ring member, wherein said metal ring member comprises a plurality of thin, endless belt-form metal ring sheets superposed in the radial direction, and of these plurality of metal ring sheets, the innermost and outermost metal ring sheets are made of a metal material with high wear resistance; and the middle ring sheets are made of a metal material with a higher Young's modulus than that of said innermost and outermost metal ring sheets.

2. The metal V-belt according to claim 1, wherein the tensile strength of the metal material that makes up said middle ring sheets is greater than the tensile strength of the metal material that makes up said innermost and outermost metal ring sheets.

3. The metal V-belt according to claim 1, wherein the tensile fatigue strength of the metal material that makes up said middle ring sheets is greater than the tensile fatigue strength of the metal material that makes up said innermost and outermost metal ring sheets.

4. The metal V-belt according to claim 1, wherein the metal material that makes up said innermost and outermost metal ring sheets is maraging steel, and the metal material that makes up said middle ring sheets is stainless steel.

5. The metal V-belt according to claim 1, wherein said metal ring members comprise 12 of said ring sheets superposed in the radial direction.

6. The metal V-belt according to claim 1, wherein said drive pulley comprises a drive-side stationary pulley half and a drive-side movable pulley half, said metal ring members are sandwiched between these two pulley halves, and drive-side movable pulley half is controlled so as to move in the axial direction, which causes said metal element members to move in the radial direction and varies the loop radius of said metal V-belt with respect to said drive pulley;

said driven pulley comprises a driven-side stationary half and a driven-side movable half, said metal element members are sandwiched between these two pulley halves, and said driven-side movable pulley half is controlled so as to move in the axial direction, which causes said metal element members to move in the radial direction and varies the loop radius of said metal V-belt with respect to said driven pulley; and the gear ratio between said drive pulley and said driven pulley is continuously variable.

7. The metal V-belt according to claim 1, wherein said metal element members are made in a shape having a body with V-surfaces on the left and right ends, and ears that extend upward and out to the left and right from the center of this body, a smooth saddle surface is formed on the left and right upper surfaces of the body, a smooth support surface is formed on each of the lower surfaces of the left and right ears, and a pair of slots is formed in between the saddle surfaces and the support surfaces; and a pair of said metal ring members is inserted into these slots on the left and right, so that numerous said metal element members are disposed along said metal ring member.

8. A metal V-belt for transmitting power, looped between a drive pulley and a driven pulley, comprising:

an endless belt-form metal ring member; and numerous metal element members supported along this metal ring member, wherein said metal ring member comprises a plurality of thin, endless belt-form metal ring sheets superposed in the radial direction, and of these plurality of metal ring sheets, the innermost and outermost metal ring sheets are made of a metal material with high wear resistance;

the middle ring sheets are made of a metal material with a high tensile fatigue strength; and a metal material is used that has a Young's modulus such that the tensile stress acting on said innermost and outermost metal ring sheets is less than the tensile stress acting on said middle ring sheets.

* * * * *